G. SMITH.
PRESSURE GOVERNOR FOR HEATING SYSTEMS.
APPLICATION FILED JUNE 7, 1909.

1,016,372.

Patented Feb. 6, 1912.
3 SHEETS—SHEET 1.

G. SMITH.
PRESSURE GOVERNOR FOR HEATING SYSTEMS.
APPLICATION FILED JUNE 7, 1909.

1,016,372.

Patented Feb. 6, 1912.
3 SHEETS—SHEET 3.

Witnesses.

Inventor.

UNITED STATES PATENT OFFICE.

GRANT SMITH, OF TORONTO, ONTARIO, CANADA

PRESSURE-GOVERNOR FOR HEATING SYSTEMS 1,016,372.  Specification of Letters Patent.  Patented Feb. 6, 1912.

Application filed June 7, 1909. Serial No. 500,545.

*To all whom it may concern:*

Be it known that I, GRANT SMITH, of the city of Toronto, in the county of York and Province of Ontario, Canada, have invented certain new and useful Improvements in Pressure-Governors for Heating Systems; and I hereby declare that the following is a full, clear, and exact description of the same.

It has been ascertained by actual experience that the best results, in steam and hot water heating, are obtained from the rapid circulation of the heating agent; i. e.—the number of heat units radiated to the atmosphere increase in proportion to the increase of rapidity of circulation.

The rapidity of circulation can be effected by creating an artificial pressure on the heating agent, raising the boiling point, controlling the vaporization, and retaining the heat units in a latent condition. This is accomplished by employing a governing device to resist the expansion of the heating agent until the latter attains a predetermined maximum, the governing device then yielding, and relieving the pressure, and automatically returning again to its resisting condition.

The invention therefore relates to a governing device by which these functions can be attained and which will return the heating agent from the expansion chamber, expansion tank, or feed pipe into the heating apparatus without permitting a vacuum to be created therein.

For an understanding of the invention reference is to be had to the following description and to the accompanying drawings in which:—

Figure 1:
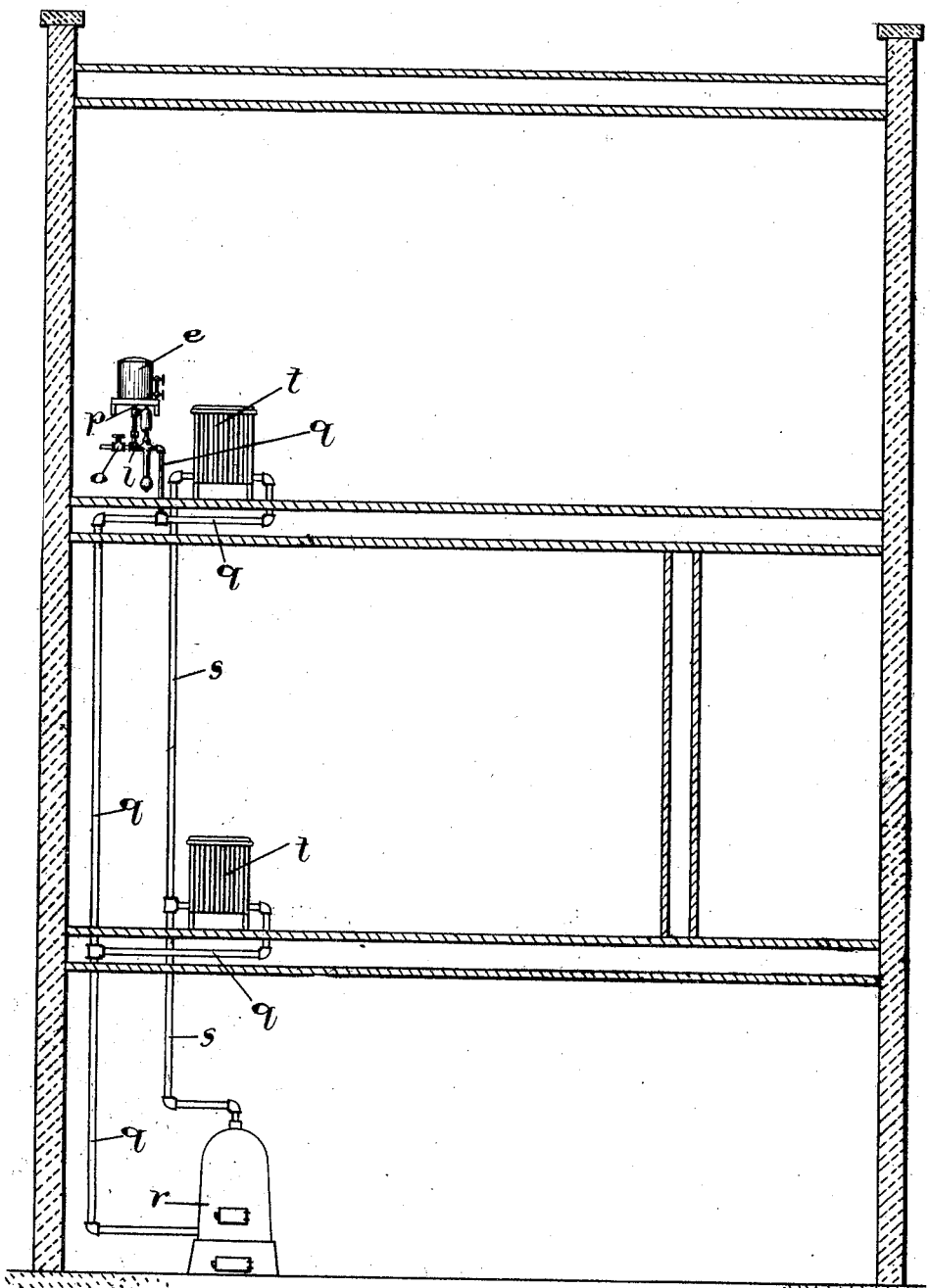
Figure 2:
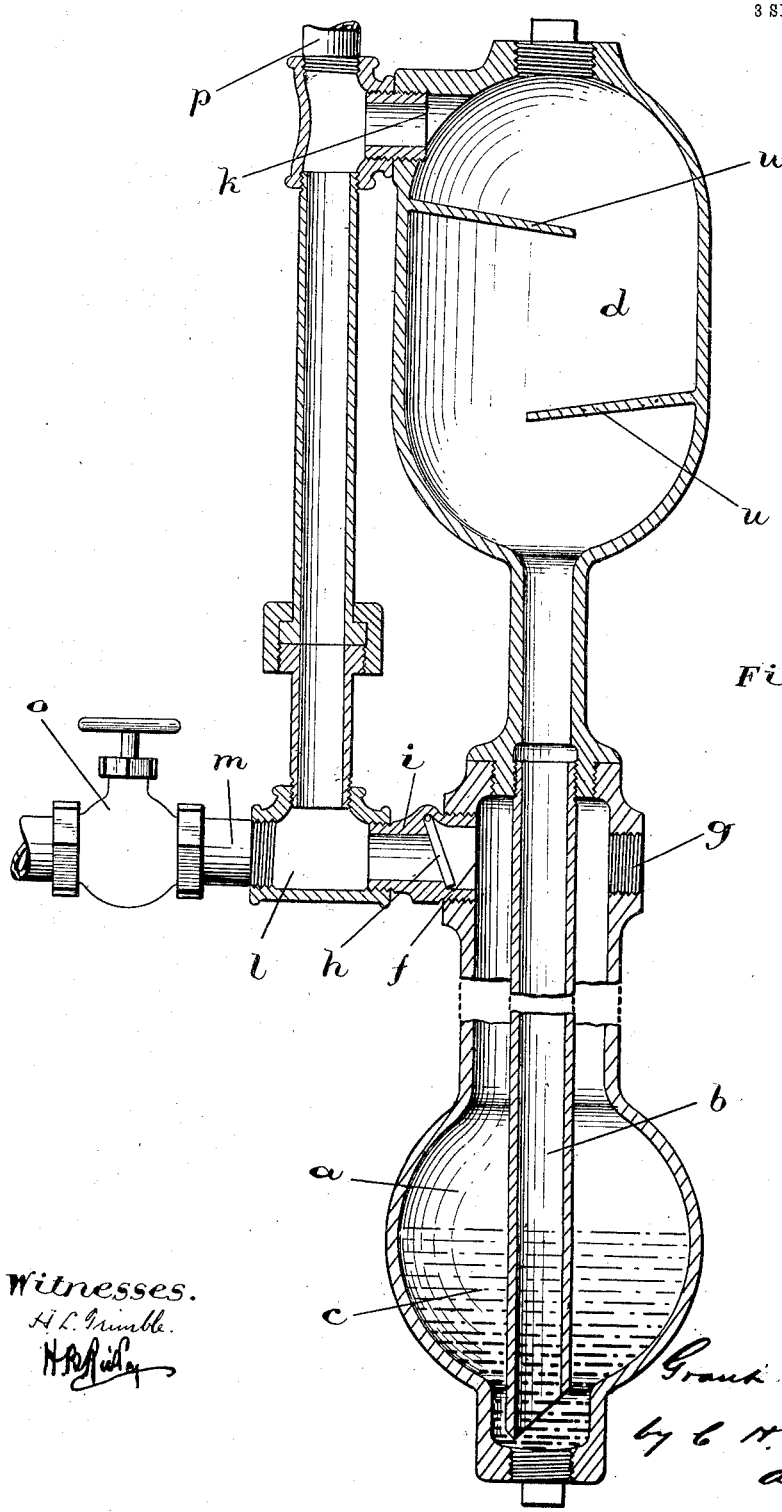
Figure 3:
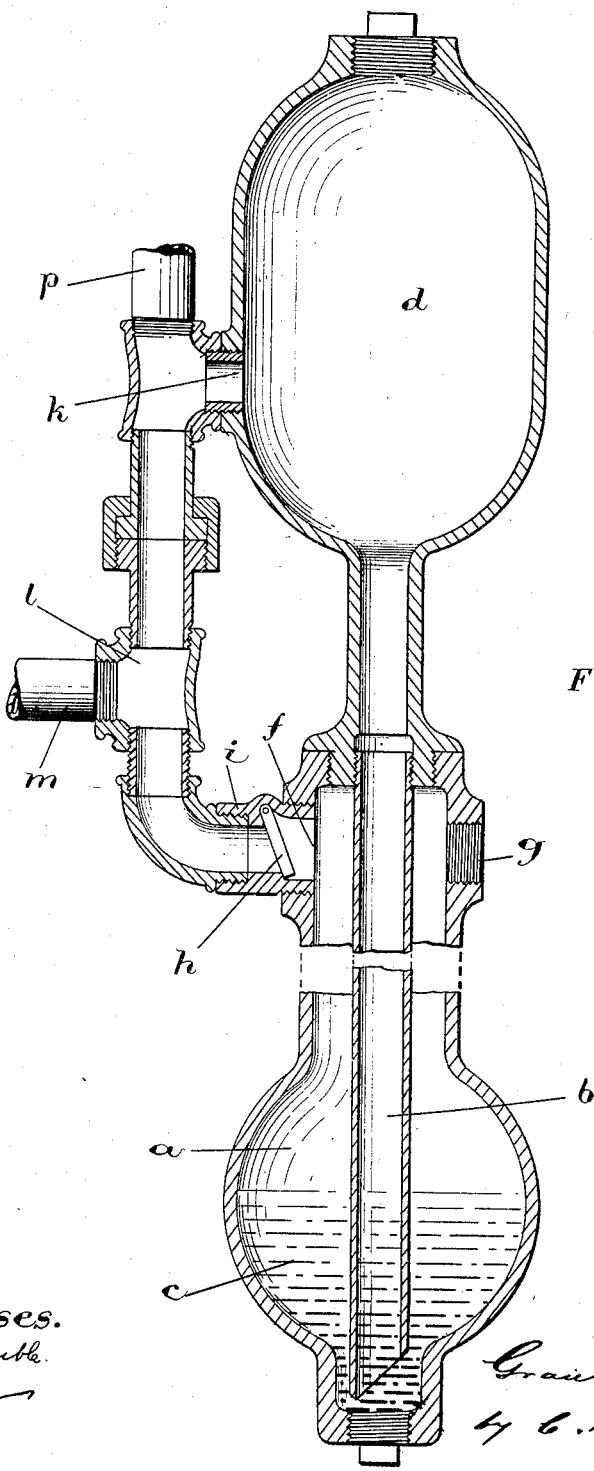

Figure 1, is a sectional elevation of a heating system. Fig. 2, is a vertical section of the device governing the pressure in a heating system, and Fig. 3, is a modification of the construction shown in Fig. 2.

Like characters of reference refer to like parts throughout the specification and drawings.

The application of artificial pressure to the heating agent, when such artificial pressure exceeds atmospheric pressure at the sea level, increases the degree of heat required to bring the heating agent to boiling point in the ratio of the excess of artificial pressure to atmospheric pressure. This artificial pressure results in the prevention of the vaporization of the heating agent at 212° Fahrenheit, the extra heat units becoming latent in the heating agent to be given off by radiation during the circulation of the heating agent through the heating apparatus.

The latency of the heat units increases the expansive power of the heating agent and it is necessary therefore to provide for the increased expansion so that the pressure governing device will yield and provide instant relief when the pressure exceeds a predetermined maximum, and instantly restore the pressure when the excess is relieved. The device by which this pressure is created and relieved, may be described as comprising a mercury chamber $a$, a relief pipe $b$ having one end contained within the mercury chamber $a$ and sealed by the mercury therein, and the other end connected with an expansion chamber $d$ which in turn may be connected with an expansion tank $e$. The mercury chamber is provided with two ports $f$ and $g$ above the mercury, the port $f$ being controlled by a check valve $h$ preventing the heating agent within the mercury chamber finding an outlet through the port, but permitting the inlet, through the port $f$ into the mercury chamber, of the water from the expansion chamber and expansion tank, or for the admission of the water from the water main. In practice I find it advisable to connect the feed pipe $i$ to the port $f$ and pivot the check valve $h$ within the former so that the check valve will open to permit the contents of the feed pipe passing into the upper part of the mercury chamber $a$.

The feed pipe which may be built up of any number of sections has its upper end connected through a port $k$ with the expansion chamber $d$, and may be connected with the expansion tank $e$ by a pipe $p$. Between the ports $k$ and $f$ the feed pipe is provided with a T $l$ to which a water main $m$ may be connected, the water main being provided with a valve $o$ regulating the flow of water to the feed pipe. The water passes through the water main m and the feed pipe i into the mercury chamber a above the mercury c, and, filling the mercury chamber, flows through the port g into the return pipe q of the heating system, which feeds it to the boiler r. The water when heated, circulates through the flow pipe s to the radiators t and returns to the boiler r through the return pipe q with which the radiators are connected.

I can install my pressure regulating device on any part of the system between the expansion tank and the return header of the boiler, although I have shown it in the present drawings to be connected with the return pipe of the topmost radiator, and with the expansion tank, the bottom of which is on the same level as the top of that radiator.

The apparatus as shown in Fig. 1, is designed for hot water heating purposes, and in the mercury chamber is placed sufficient mercury to create a predetermined pressure. In the event of the pressure resulting from the expansion of the heating agent exceeding the predetermined pressure, the mercury will be forced from the mercury chamber a into the expansion chamber for the passage of the heating agent to the latter, and from the expansion chamber the heating agent passes into the expansion tank e. When the expansion of the heating agent returns to normal, the mercury drops through the relief pipe into the mercury chamber, and seals the relief pipe, the heating agent returning from the expansion tank and expansion chamber, through the feed pipe i displacing the check valve h and passing into the mercury chamber through the port f from which it circulates to the return pipe q of the heating system.

Under ordinary conditions the mercury is not apt to be forced through the expansion chamber into the expansion tank and consequently the expansion chamber need not be provided with baffle plates, this construction being shown in Fig. 3, but to prevent the mercury being forced through the expansion chamber under any abnormal condition I provide the latter with inclined baffle plates u interposed between the port k and the inlet port for the relief pipe b, the baffle plates being preferably arranged alternately on opposite sides of the expansion chamber as shown in Fig. 2.

Having thus fully described my invention what I claim as new and desire to secure by Letters Patent is:—

1. The hereinbefore described device for governing pressure in a heating system, comprising a sealing chamber containing a sealing agent and having a port above the sealing agent for connection with a circulating pipe of a heating system, and a port separate from the first mentioned port for the feed of the heating agent into the sealing chamber above the sealing agent, a relief pipe, one end of which is contained in the sealing chamber and sealed by the sealing agent below the level of the ports, a separating chamber connected with the other end of the relief pipe and having a port, a by-pass pipe connected with the port of the separating chamber and with the second mentioned port of the sealing chamber, and a check valve pivoted within the by-pass pipe to permit of the flow of the heating agent from the by-pass pipe into the sealing chamber, and to prevent the flow of the heating agent and sealing agent from the sealing chamber into the by-pass pipe.

2. The hereinbefore described device for governing pressure in a heating system comprising a sealing chamber containing a sealing agent and having a port above the sealing agent for connection with a circulating pipe of a heating system, and a port separate from the first mentioned port for the feed of the heating agent into the sealing chamber above the sealing agent, a relief pipe, one end of which is contained in the sealing chamber and sealed by the sealing agent below the level of the ports, a separating chamber connected with the other end of the relief pipe and having a port, a by-pass pipe for connection with an expansion chamber connected with the port of the separating chamber and with the second mentioned port of the sealing chamber, a check valve pivoted within the by-pass pipe permitting of the flow of the heating agent from the by-pass pipe into the sealing chamber above the sealing agent and preventing the flow of the sealing agent and heating agent from the sealing chamber into the by-pass pipe, and a connection for the by-pass pipe adapted to communicate with the water main.

3. The hereinbefore described device for governing pressure in a heating system, comprising a sealing chamber containing a sealing agent and having a port above the sealing agent for connection with a circulating pipe of a heating system, and a port separate from the first mentioned port for the feed of the heating agent into the sealing chamber above the sealing agent, a relief pipe, one end of which is contained in the sealing chamber and sealed by the sealing agent below the level of the ports, a separating chamber connected with the other end of the relief pipe and having a port, a by-pass pipe for connection with an expansion chamber connected with the port of the separating chamber and with the second mentioned port of the sealing chamber, a check valve pivoted within the by-pass pipe permitting of the flow of the heating agent from the by-pass pipe into the sealing chamber above the sealing agent and preventing the flow of the sealing agent and heating agent from the sealing chamber into the by-pass pipe, a connection for the by-pass pipe adapted to communicate with the water main, and inclined baffle plates one superposed above the other in the separating chamber.

Toronto, April 22nd, 1909.

GRANT SMITH.

In presence of—
 C. H. RICHES,
 H. L. TRIMBLE.